US011165320B2

(12) United States Patent
Yoshida et al.

(10) Patent No.: US 11,165,320 B2
(45) Date of Patent: Nov. 2, 2021

(54) ALIGNMENT APPARATUS FOR ELECTRIC CONDUCTORS

(71) Applicant: HONDA MOTOR CO., LTD., Tokyo (JP)

(72) Inventors: Takashi Yoshida, Tochigi-ken (JP); Xuan Kan, Tochigi-ken (JP)

(73) Assignee: HONDA MOTOR CO., LTD., Tokyo (JP)

( * ) Notice: Subject to any disclaimer, the term of this patent is extended or adjusted under 35 U.S.C. 154(b) by 215 days.

(21) Appl. No.: 16/516,401

(22) Filed: Jul. 19, 2019

(65) Prior Publication Data

US 2020/0028419 A1 Jan. 23, 2020

(30) Foreign Application Priority Data

Jul. 23, 2018 (JP) .............................. JP2018-137616

(51) Int. Cl.
 *B23P 19/00* (2006.01)
 *H02K 15/085* (2006.01)
(52) U.S. Cl.
 CPC ...... *H02K 15/085* (2013.01); *Y10T 29/53143* (2015.01)
(58) Field of Classification Search
 CPC ............... H02K 15/064; H02K 15/085; Y10T 292/1021; Y10T 29/5187; Y10T 29/53143
 USPC ...... 29/732, 564.5, 596, 605, 729, 731, 745, 29/825
 See application file for complete search history.

(56) References Cited

U.S. PATENT DOCUMENTS

| 9,917,494 B2* | 3/2018 | Yamada ............... H02K 15/085 |
| 2015/0207391 A1 | 7/2015 | Yamada et al. |
| 2016/0233749 A1 | 8/2016 | Ueno et al. |

FOREIGN PATENT DOCUMENTS

| CN | 105556808 | 5/2016 |
| WO | 2014/010642 | 1/2014 |

OTHER PUBLICATIONS

Chinese Office Action and Search Report for Chinese Patent Application No. 201910666520.9 dated Jan. 6, 2021.

* cited by examiner

*Primary Examiner* — Thiem D Phan
(74) *Attorney, Agent, or Firm* — Amin, Turocy & Watson, LLP

(57) ABSTRACT

An alignment apparatus includes a plurality of holders capable of revolving and configured to support at least one of a first leg and a second leg of a segment and hold the segments in an arc-shape-aligned state. A revolving mechanism configured to revolve the holders includes turntables. Adjacent two of the turntables are coupled together via one of link members. For example, the link member is provided between the turntable and the turntable. As a result, a link mechanism is configured.

7 Claims, 13 Drawing Sheets

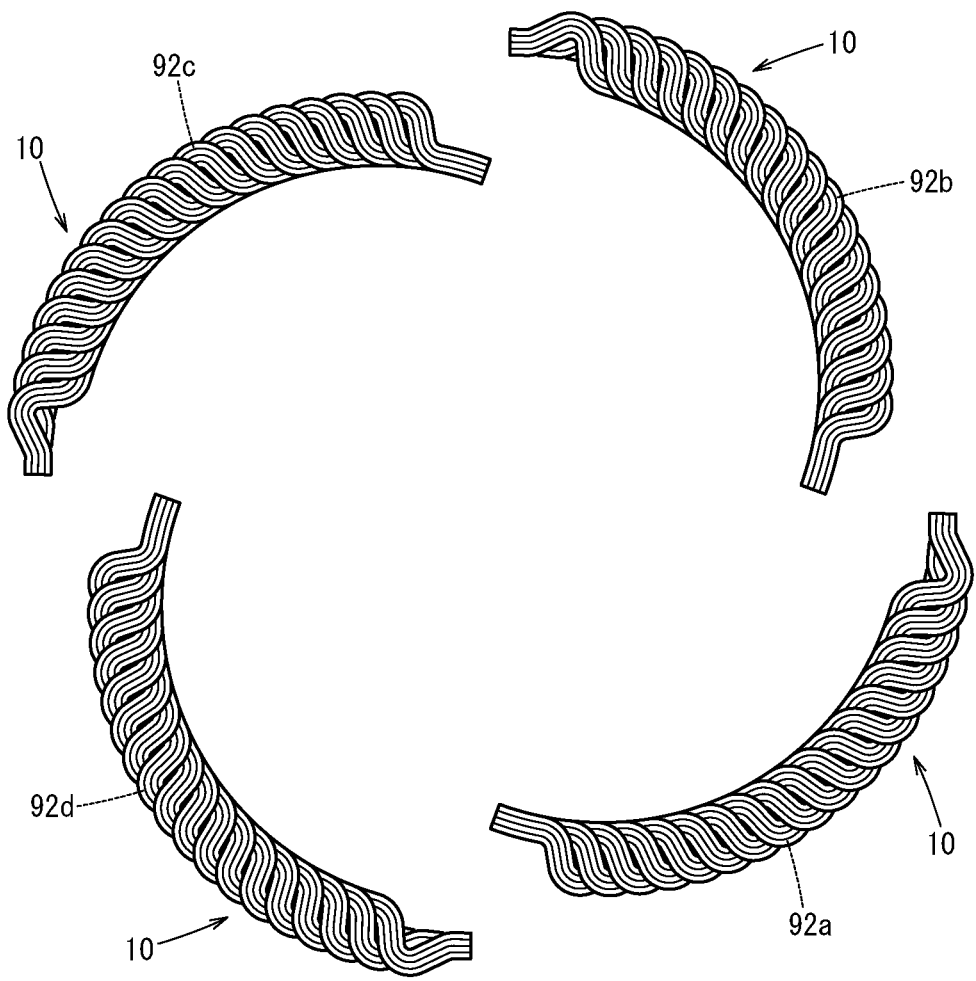

ALIGNMENT APPARATUS FOR ELECTRIC CONDUCTORS

CROSS-REFERENCE TO RELATED APPLICATION

This application is based upon and claims the benefit of priority from Japanese Patent Application No. 2018-137616 filed on Jul. 23, 2018, the contents of which are incorporated herein by reference.

BACKGROUND OF THE INVENTION

Field of the Invention

The present invention relates to an alignment apparatus for electric conductors, for annularly aligning electric conductors to be inserted in slots of a stator core.

Description of the Related Art

There is known a stator that has electric conductors (hereafter, also written as "segments") inserted in two of a plurality of slots formed along a circumferential direction of an annular stator core. In this case, the segments represent an electromagnetic coil, and are electrically connected to a control circuit. In this instance, each of the segments includes: a first leg; a second leg extending parallel to and facing the first leg; and a folded-back portion, which is curved and connected between the first leg and the second leg, and for this reason, each of the segments is substantially U-shaped. Since the plurality of slots are formed in radiating shapes, for example, the first leg faces toward an inner circumferential side of the stator core, and the second leg faces toward an outer circumferential side of the stator core.

After the plurality of segments have been aligned on the same circular circumference, in other words, after the plurality of segments have been annularly aligned, the first legs and the second legs are inserted into the slots while the shape thereof is maintained.

The applicants of the present invention, have proposed an alignment apparatus that annularly aligns a plurality of segments, in International Publication No. WO 2014/010642. This alignment apparatus includes a plurality of holders disposed radially along a diameter direction of a circle; and an alignment mechanism that moves the holders in the diameter direction. Initially, the holders themselves are disposed at positions spaced apart from each other while holding at least one segment, and typically holding four to eight segments, and, in this state, the holders are moved toward the center of the circle under action of the alignment mechanism. That is, the holders approach each other. Consequently, the segments are annularly aligned.

Thereafter, the segments are gripped by a gripping mechanism that constitutes part of a transport mechanism and are extracted from the holders. The segments are transported to the stator core, and distal ends of the first legs and the second legs are inserted in the slots. Furthermore, the gripping mechanism releases the segments, whereby the first legs and the second legs descend along the slots.

SUMMARY OF THE INVENTION

A main object of the present invention is to provide an alignment apparatus for electric conductors by which it is easy for electric conductors to be transported in a held state.

Another object of the present invention is to provide an alignment apparatus for electric conductors by which it is easy for electric conductors to be annularly aligned.

According to an aspect of the present invention, there is provided an alignment apparatus for electric conductors, for annularly aligning electric conductors, each of the electric conductors including: a first leg and a second leg extending substantially in parallel with each other; and a folded-back portion connected between the first leg and the second leg, the apparatus including:

a plurality of holders configured to support at least one of the first leg and the second leg and hold a plurality of the electric conductors in an arc-shape-aligned state; and a revolving mechanism configured to, by revolving the plurality of holders, revolve the arc-shape-aligned electric conductors and dispose the arc-shape-aligned electric conductors on the same circular circumference thereby annularly aligning the arc-shape-aligned electric conductors, wherein adjacent two of the plurality of holders are coupled together via one link member.

Thus, in the present invention, a link mechanism is configured by adjacent two of the holders and the link member. Hence, the two holders can be synchronously revolved, and the electric conductors held in these holders can be positioned on a circular circumference. In other words, it becomes easy for the electric conductors held in the holder to be annularly aligned.

Note it is preferable to provide a base on which the plurality of holders are provided so as to be revolvable around a revolving shaft, and preferable to configure the revolving mechanism to include: a drive shaft configured to be coupled to the revolving shaft in an attachable and detachable manner; and a turntable provided with the drive shaft and configured to rotate integrally with the drive shaft.

In this configuration, it becomes possible to convey or transport the holder in a state of holding the electric conductors, by separating the drive shaft from the revolving shaft. Therefore, it becomes easy for a plurality of holders to be prepared for repeated reuse, so the electric conductors can be annularly aligned efficiently, and moreover, at low cost. As a result, a stator can be obtained at low cost and efficiently.

Moreover, it is preferable that one of the turntable and the link member is provided with a coupling shaft, and the other one of the turntable and the link member has, formed therein, a coupling hole into which the coupling shaft is inserted. The link mechanism can be easily configured by the coupling shaft being inserted in the coupling hole.

Incidentally, it is assumed that rotation of at least one turntable will stop before rotation of another turntable due to rotational speeds of the turntables differing. In order that it becomes possible, even under this condition, for the turntable to be rotated to a final rotational position, it is preferable for the coupling hole to be configured as an elongated hole in which the coupling shaft is movable in a revolving direction of the holder. Since the coupling shaft can move relatively within this elongated hole, further rotation of the turntable proportional to this relative movement is enabled.

Furthermore, it is preferable that each of the turntables is individually provided with a rotational drive unit configured to rotationally drive the turntable. In this case, even under the condition that rotation of at least one turntable has stopped earlier as described above, a rotational drive force can be applied to the other turntable by the rotational drive unit provided in the other turntable. It therefore becomes possible for all of the holders to be revolved.

It is preferable that the alignment apparatus further includes: a revolving mechanism support panel where the revolving mechanism is provided; and a lifting mechanism configured to raise and lower the revolving mechanism support panel. In this case, it becomes possible for the revolving mechanism support panel and the base in a state where the drive shaft and the revolving shaft are coupled to each other, to be raised or lowered integrally with each other by the lifting mechanism. It therefore becomes easy for the drive shaft to be coupled to the revolving shaft or separated from the revolving shaft. Moreover, in the alignment apparatus, since a place where the drive shaft is coupled to the revolving shaft, and a place where the holder is revolved can be separately provided, it is possible to adopt a simple configuration enabling it to be avoided that, for example, the revolving holder interferes with some kind of member, or the like.

In the case of the base and the lifting mechanism being provided, it is preferable to provide a guide mechanism configured to guide the base to the lifting mechanism. Since the base moves to the lifting mechanism by the guide mechanism, the drive shaft and the revolving shaft can be reliably coupled.

It is preferable that the base is provided with a rotating body configured to assist revolution of the holder. This is because it becomes possible for the holder to revolve easily by the holder sliding on the rotating body.

Moreover, it is preferable that the base is provided with a stopper portion configured to abut on each of the plurality of holders. Since revolution of the holder stops by the holder abutting on the stopper portion, there is no need for the holder to be precisely stopped by the revolving mechanism. That is, it becomes easy for the holder to be stopped at a certain position, without strictly improving stopping accuracy of the revolving mechanism.

Due to the present invention, since a link mechanism is configured by adjacent two of the holders and the link member, the two holders can be synchronously revolved. As a result, the electric conductors held in the two holders are positioned on the same circular circumference. It therefore becomes easy for the electric conductors to be annularly aligned. Furthermore, since the electric conductors are annularly aligned, it is also easy for the electric conductors to be inserted in slots of a stator core.

The above and other objects, features, and advantages of the present invention will become more apparent from the following description when taken in conjunction with the accompanying drawings, in which a preferred embodiment of the present invention is shown by way of illustrative example.

BRIEF DESCRIPTION OF THE DRAWINGS

FIG. 10 is a schematic plan view of when the electric conductor is held by the holder in an open state;

DESCRIPTION OF THE PREFERRED EMBODIMENTS

A preferred embodiment of an alignment apparatus for electric conductors according to the present invention will be presented and described in detail below with reference to the accompanying drawings. Note that hereafter, electric conductor will also be written as "segment".

Figure 1:
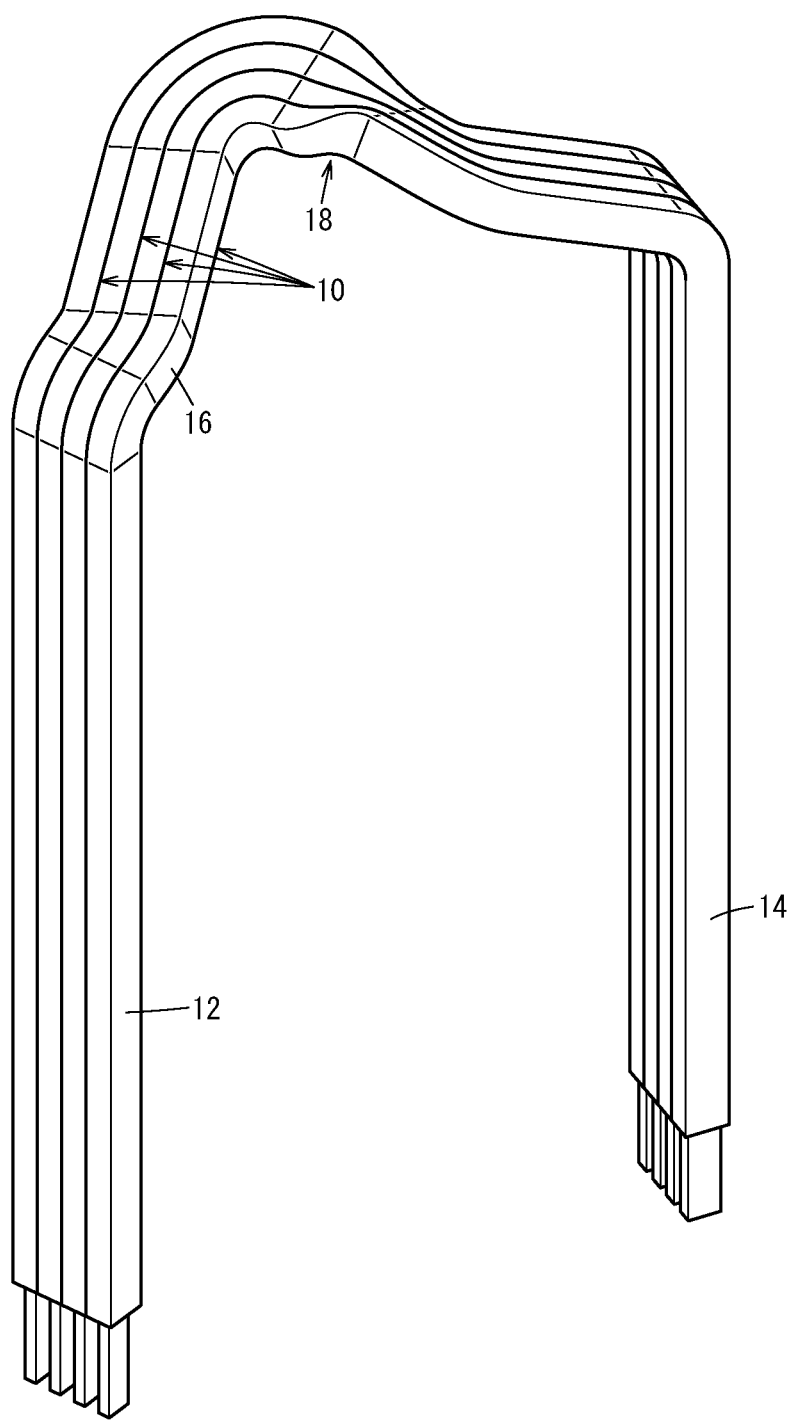
FIG. 1 is an overall schematic perspective view showing a state where segments, each being an electric conductor, have been bundled.

First, the segments 10 shown in FIG. 1 will be described. Note that FIG. 1 shows a state where four of the segments 10 are bundled together.

Each segment 10 includes a first leg 12, a second leg 14 extending substantially in parallel with the first leg 12, and a turn portion 16 (a folded-back portion) interposed between the first leg 12 and second leg 14. The turn portion 16 is curved so as to be folded back in a direction from the first leg 12 toward the second leg 14, and, as a result, each of the segments 10 is substantially U-shaped. A crank portion 18 of meandering shape is formed on the turn portion 16.

Figure 2:
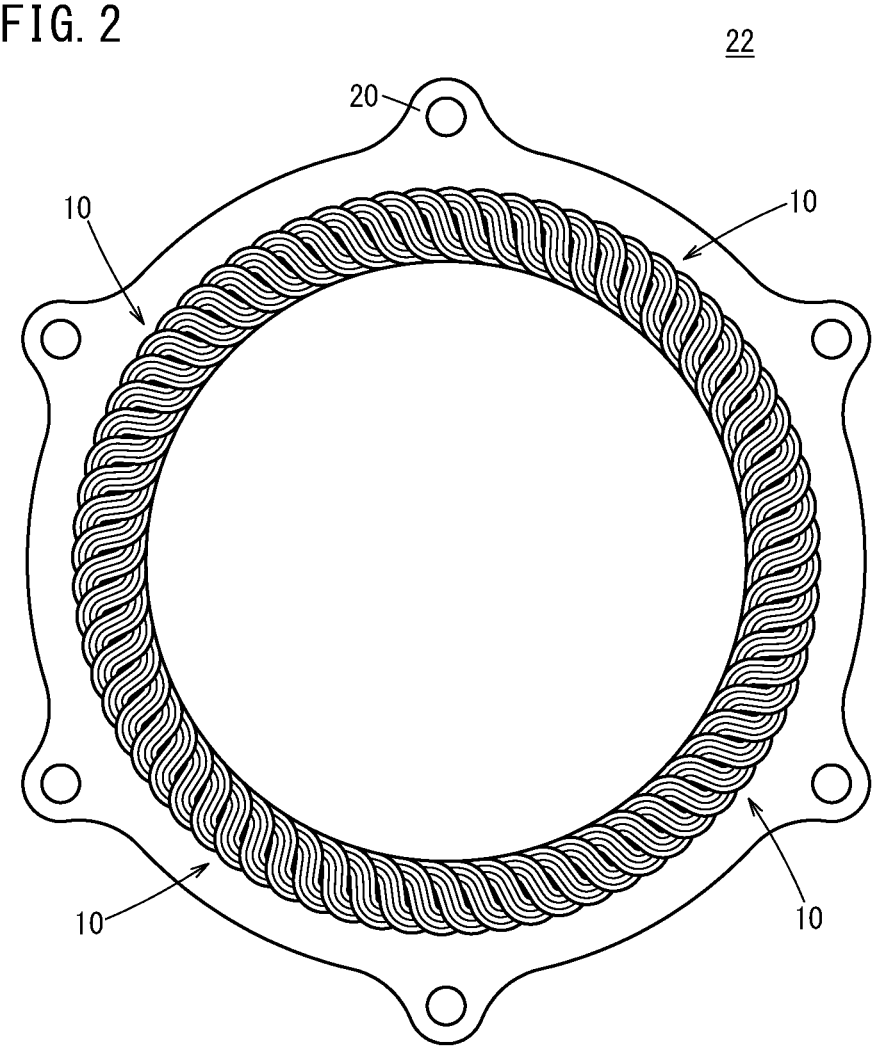
FIG. 2 is a schematic plan view of a stator configured by the segments being inserted in slots of a stator core.

The segments 10 each having the above shape are preliminarily aligned in a preliminary alignment section, and thereafter transported to a later-mentioned alignment apparatus 30 (refer to FIG. 3) by a first transport mechanism. Further, the segments 10 are aligned in an annular shape (circular ring shape), under action of the alignment apparatus 30, thereafter extracted from the alignment apparatus 30 by a second transport mechanism, and then transported to a stator core 20 shown in FIG. 2.

The stator core 20 is substantially annular, and has a plurality of slots (not illustrated) formed radially along its circumferential direction. The first legs 12 are inserted in one slot, and the second legs 14 are inserted in another slot. As a result, the segments 10 serve an electrical path between the two slots. That is, a conductive state is attained between the slot in which the first legs 12 are inserted and the slot in which the second legs 14 are inserted.

Then, each of the first legs 12 and second legs 14 is appropriately joined to a first leg 12 or a second leg 14 of another segment 10. As a result, an electromagnetic coil composed of a plurality of the segments 10 is formed to thereby constitute a stator 22. Note that in one slot, the first legs 12 of the four segments 10 and the second legs 14 of different four segments 10 are aligned from an inner circumferential side to an outer circumferential side, hence a total of eight legs are aligned alongside one another.

Figure 3:
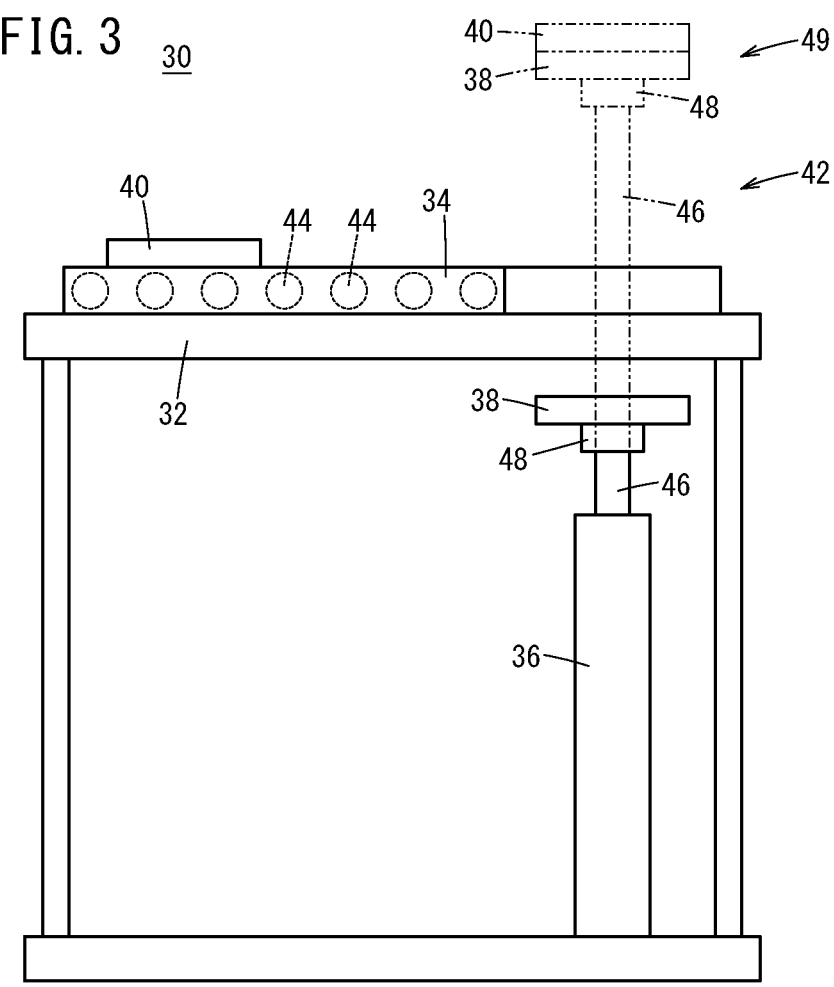
FIG. 3 is a schematic side view of an alignment apparatus according to an embodiment of the present invention.

Next, the alignment apparatus 30 for annularly aligning the segments 10 will be mentioned in detail. FIG. 3 is a schematic side view of the alignment apparatus 30 according to an embodiment of the present invention. This alignment apparatus 30 includes a frame 32, a roller conveyor 34 (a guide mechanism) provided to the frame 32, a lifting cylinder 36 as a lifting mechanism, supported by the frame 32, and a later-mentioned revolving operation unit 38 and holding unit 40. An alignment section 42 by which the revolving operation unit 38 and the holding unit 40 are coupled to align the segments 10, is provided above the lifting cylinder 36.

The roller conveyor 34 is provided on an upper surface of the frame 32, and extends along a left-right direction in FIG. 3. The roller conveyor 34 includes a plurality of rollers 44 that roll in a state the holding unit 40 is placed thereon. The holding unit 40 is conveyed to the alignment section 42 as the rollers 44 roll. That is, the roller conveyor 34 is a guide mechanism guiding the holding unit 40.

The lifting cylinder 36 includes a lifting rod 46 that faces vertically upwardly. An upper end of the lifting rod 46 faces the alignment section 42, and is provided with the revolving operation unit 38 via an adaptor 48. The revolving operation unit 38 is positioned below the holding unit 40 in the alignment section 42 when the lifting rod 46 has retracted (descended) to a maximum. On the other hand, when the lifting rod 46 has advanced (ascended) to a maximum, the revolving operation unit 38 is raised, integrally with the holding unit 40, to a gripping section 49 above the alignment section 42.

Figure 4:
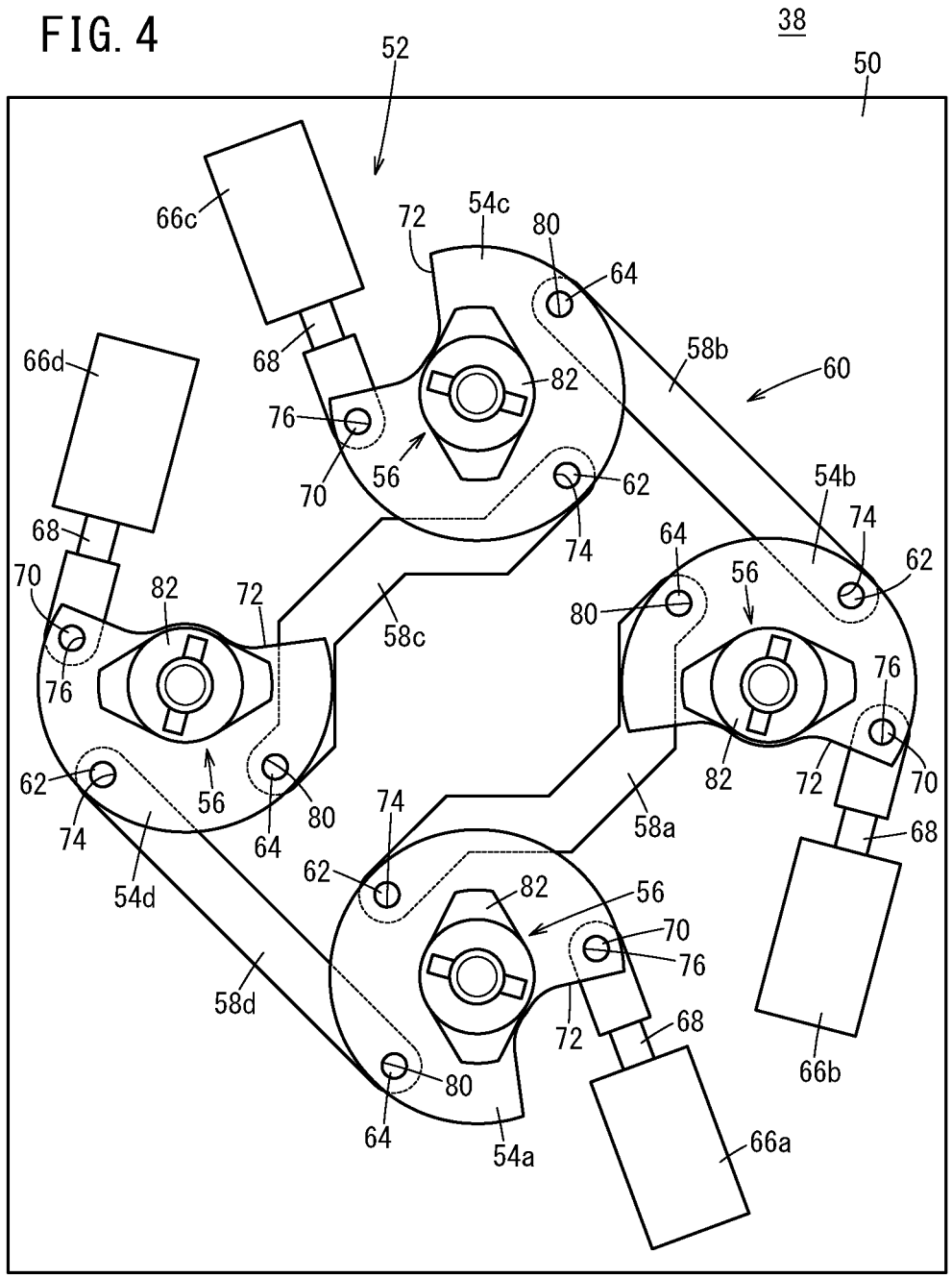
FIG. 4 is a schematic plan view of a revolving operation unit of the alignment apparatus of FIG. 3.

FIG. 4 is a schematic plan view of the revolving operation unit 38. The revolving operation unit 38 includes a support panel 50 (a revolving mechanism support panel) held by the adaptor 48, and a revolving mechanism 52 provided to the support panel 50. In the present embodiment, the revolving mechanism 52 includes: four turntables 54a to 54d; and drive shafts 56 provided respectively to the turntables 54a to 54d. The four turntables 54a to 54d and four link members 58a to 58d jointly form a link mechanism 60. Each of the link members 58a to 58d, which are long, has a first link side coupling shaft 62 and a second link side coupling shaft 64 provided on both end portions thereof in the longitudinal direction, in such a manner that the first link side coupling shaft 62 and the second link side coupling shaft 64 rise upwardly.

The support panel 50 has four shaft bearing holes (not illustrated) formed therein, and the shaft bearing holes have bearings (not illustrated) inserted therein. Moreover, cylinders for revolving motion (hereinafter simply referred to as revolving cylinders) 66a to 66d (rotational drive unit) arranged in vicinities of the turntables 54a to 54d, are supported on an upper surface of the support panel 50. Distal ends of rods for revolving motion (hereinafter simply referred to as revolving rods) 68 of the revolving cylinders 66a to 66d, are provided with rod side coupling shafts 70 that rise upwardly.

Figure 5:
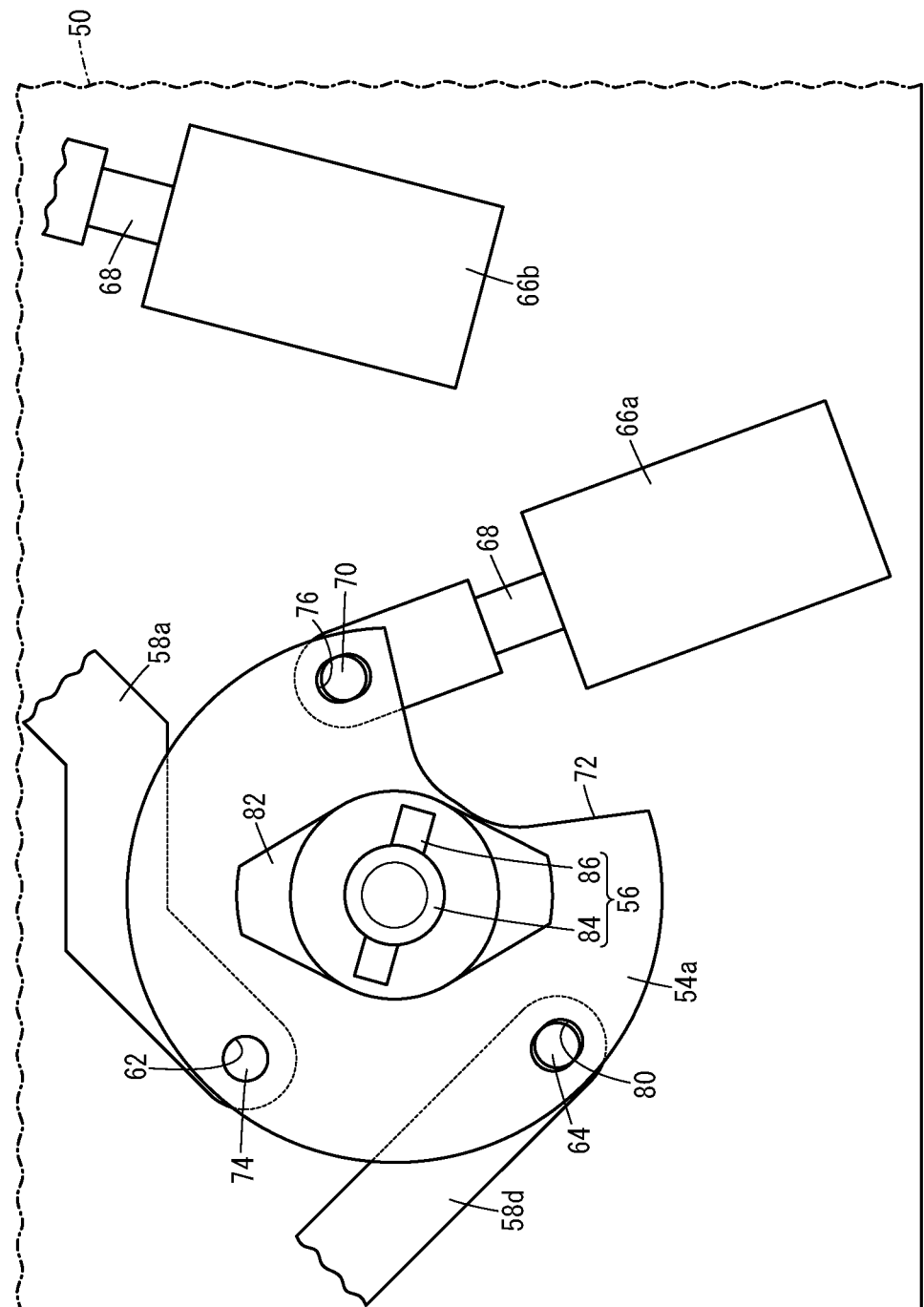
FIG. 5 is an enlarged plan view of main components, enlargedly showing part of the revolving operation unit of FIG. 4.

The turntables 54a to 54d, as shown in detail in FIG. 5, each have formed therein a cut-out portion 72 formed by cutting out part of an outer edge portion of a perfect circle in substantially a fan shape. A center portion of each of the turntables 54a to 54d is provided with a center shaft (not illustrated) that is inserted into the shaft bearing hole via the bearing. Since the bearing is interposed between an inner wall of the shaft bearing hole and the center shaft, each of the turntables 54a to 54d is supported by the support panel 50 so as to be rotatable around the center shaft. Note that FIG. 5 exemplifies the turntable 54a.

Moreover, the turntable 54a has, formed in a vicinity of its outer edge portion, a first link side coupling hole 74 and a rod side coupling hole 76 which is close to the cut-out portion 72. A hole diameter of the first link side coupling hole 74 corresponds to a diameter of the first link side coupling shaft 62 arranged upright on an upper surface of the link member 58a, hence the first link side coupling shaft 62 is fitted into the first link side coupling hole 74. On the other hand, the rod side coupling hole 76 is an elongated hole which is slightly long along a rotational direction of the turntable 54a (a circling direction of the turntable 54a). The rod side coupling shaft 70 of the revolving cylinder 66a is inserted into the rod side coupling hole 76.

The turntable 54a has a second link side coupling hole 80 formed in the vicinity of its outer edge portion, in such a manner that the cut-out portion 72 is sandwiched between the second link side coupling hole 80 and the rod side coupling hole 76. The second link side coupling hole 80 is an elongated hole which is slightly long along the rotational direction of the turntable 54a (the circling direction of the turntable 54a). The second link side coupling shaft 64 of the link member 58d is inserted into the second link side coupling hole 80.

Figure 6:
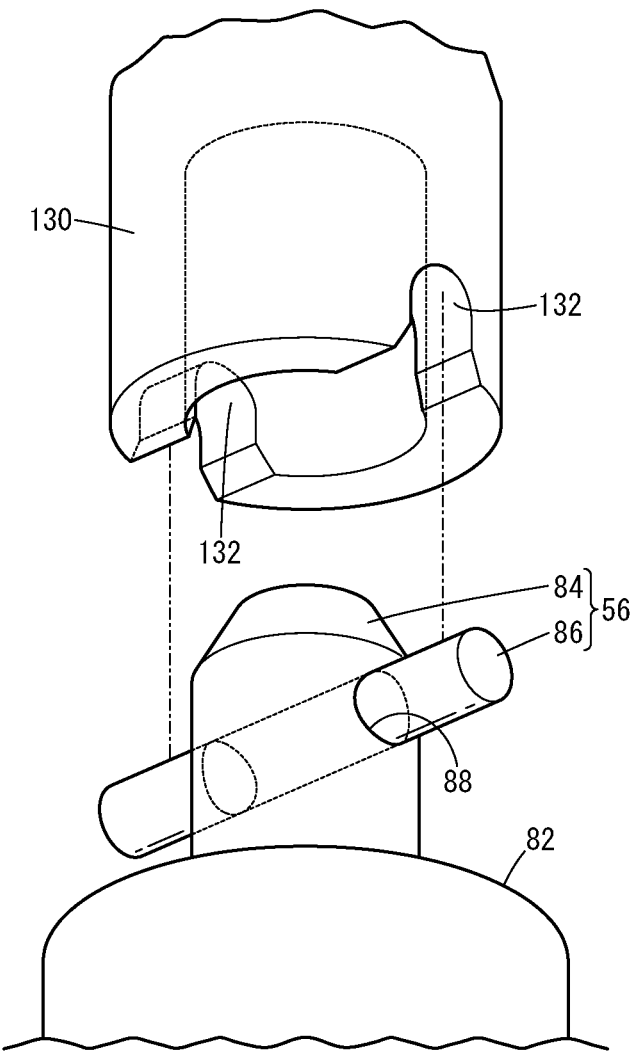
FIG. 6 is an enlarged perspective view of main components, showing a drive shaft provided on a turntable in FIG. 5, and a hollow revolving shaft with which the drive shaft engages.

A pedestal 82 is provided above the center shaft, and the drive shaft 56 is arranged upright on the pedestal 82. As shown in FIG. 6, this drive shaft 56 includes a shaft main body 84 extending upward from the pedestal 82, and an engagement bar 86 extending in a horizontal direction orthogonally to the shaft main body 84. That is, a side hole 88 is formed in the shaft main body 84 so as to penetrate the shaft main body 84, and the engagement bar 86 is fitted into the side hole 88 and thereby held in the shaft main body 84.

The remaining turntables 54b to 54d are configured similarly to the turntable 54a. Therefore, the same configuration elements will be assigned with the same reference symbols, and detailed descriptions thereof will be omitted.

As indicated above, the link member 58a forms a bridge between the turntables 54a, 54b, and the link member 58b forms a bridge between the turntables 54b, 54c. In addition, the link member 58c forms a bridge between the turntables 54c, 54d, and the link member 58d forms a bridge between the turntables 54d, 54a. Moreover, the number of revolving cylinders 66a to 66d matches the number of turntables 54a to 54d, and the revolving rods 68 are each individually coupled to the turntables 54a to 54d. The link members 58a to 58d are given shapes that do not interfere with an unillustrated support column portion.

The holding unit 40 is a conveyable body conveyable by the roller conveyor 34, and is superimposed on the revolving operation unit 38 in the alignment section 42. This holding unit 40 will be described.

Figure 7:
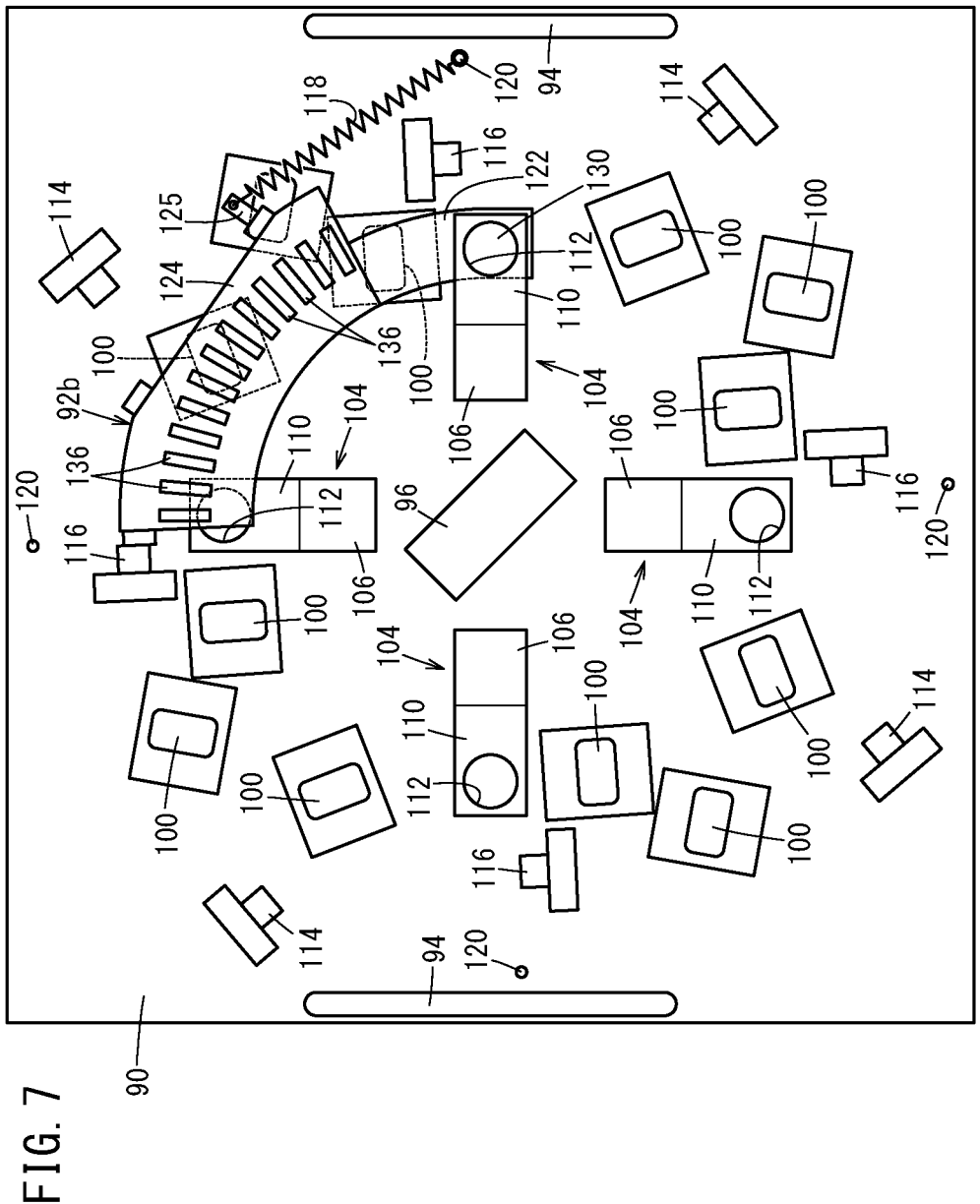
FIG. 7 is a schematic plan view of a base (a pallet) configuring a holding unit.
Figure 8:
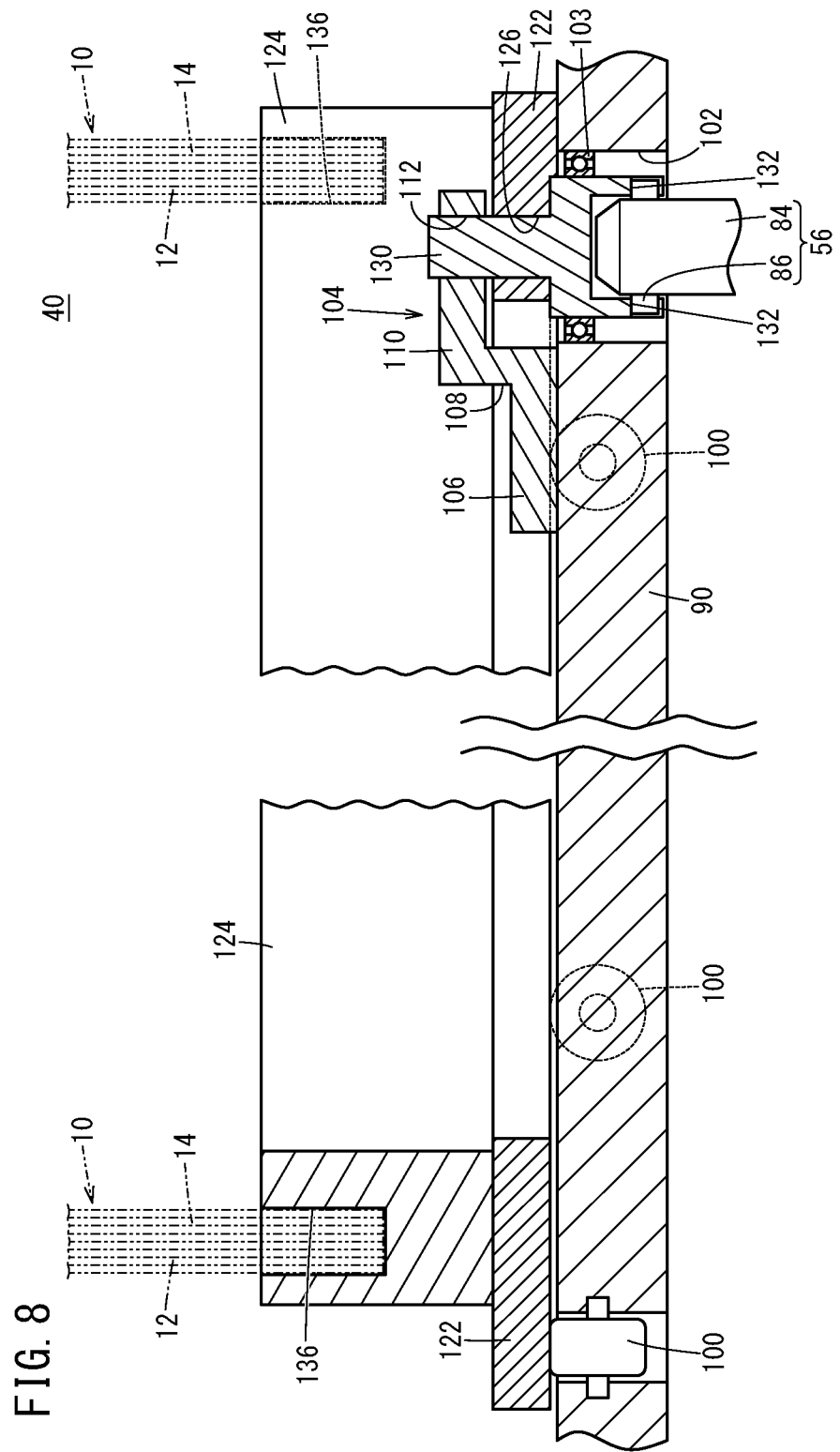
FIG. 8 is a schematic side view of the pallet (the holding unit) provided with a holder that holds the electric conductor.

FIG. 7 is a schematic plan view of a pallet 90 as a base of the holding unit 40, and FIG. 8 is a schematic side view of the pallet 90 (that is, the holding unit 40) provided with holders 92a to 92d. The pallet 90 is substantially square in planar view, and has handles 94 provided in vicinities of two of the sides that face each other, the handles 94 enabling the pallet 90 to be easily gripped by an operator or a robot.

A columnar portion 96 is provided in substantially a center of the pallet 90 corresponding to a position of the previously-mentioned support column portion. Cam followers 100 (rotating bodies) that assist revolution of the holders 92a to 92d are buried so as to surround this columnar portion 96. Three cam followers 100 correspond to each one of the holders 92a to 92d (in FIG. 7, only the holder 92b is shown, and illustration of the holders 92a, 92c, 92d is omitted). Moreover, a first revolution hole 102 (refer to FIG. 8) close to one of the three cam followers 100 is formed in a penetrating manner along a thickness direction, in the pallet 90. A shaft bearing 103 is housed in the first revolution hole 102.

Furthermore, four coupling jigs 104 are provided radially around the columnar portion 96, on an upper surface of the pallet 90. The coupling jig 104 is configured from: a horizontal leg 106 that faces the columnar portion 96 and extends horizontally; a vertical column portion 108 that rises vertically from the horizontal leg 106; and a clamping portion 110 that extends from an upper end of the vertical column portion 108 so as to project in a direction away from the horizontal leg 106, and of these, the clamping portion 110 has formed therein a second revolution hole 112 extending along an up-down direction. The second revolution hole 112 is arranged face-to-face with the first revolution hole 102.

An opened-side stopper block 114 and a closed-side stopper block 116 (each a stopper portion) are arranged upright in a vicinity of the clamping portion 110. As will be mentioned later, by each of the holders 92a to 92d abutting on either of the opened-side stopper block 114 or the closed-side stopper block 116, further revolution of the holder 92a to 92d is prevented. Moreover, a pin-shaped hooking portion 120 for hooking one end of a return spring 118 is arranged upright in a vicinity of the opened-side stopper block 114.

Figure 9:
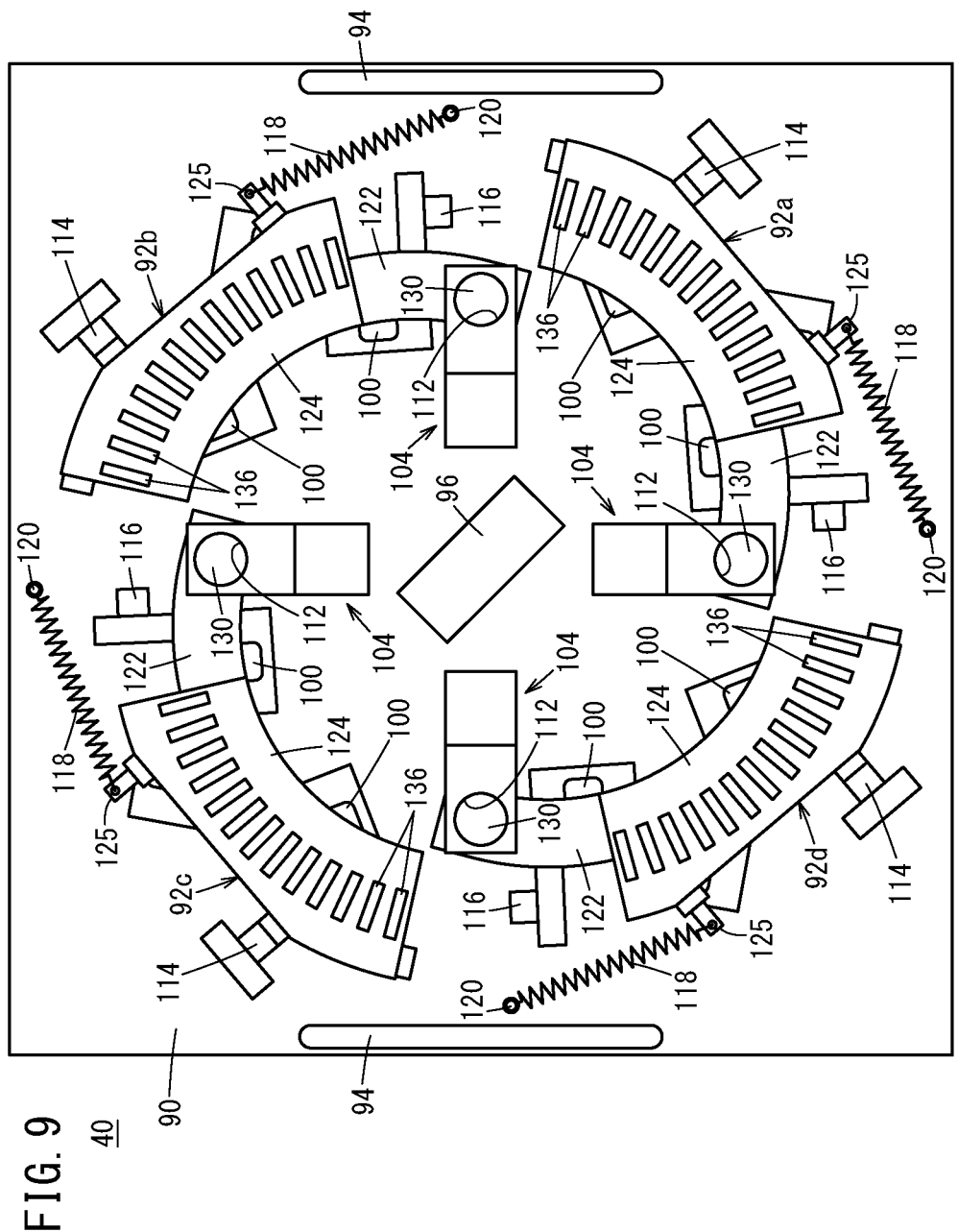
FIG. 9 is a schematic plan view of the holding unit.

As shown in FIG. 9, the holding unit 40 further includes the same number as there are of the turntables 54a to 54d, that is, four of the holders 92a to 92d. Each of the holders 92a to 92d is configured from: a handle portion 122 which is narrow; and a holding main body portion 124 which is wider than the handle portion 122. The other end of the return spring 118 is hooked on a hooking portion 125 provided to the holding main body portion 124.

A third revolution hole 126 is formed in a penetrating manner in an end of the handle portion 122. When the handle portion 122 is inserted between the pallet 90 and the clamping portion 110 of the coupling jig 104, the third revolution hole 126 lines up with the first revolution hole 102 and the second revolution hole 112. The linearly lined up first revolution hole 102, third revolution hole 126, and second revolution hole 112 are passed through by a revolving shaft 130. The shaft bearing 103 is interposed between the revolving shaft 130 and an inner wall of the first revolution hole 102.

A thickness of the handle portion 122 is slightly smaller compared to a distance from the upper surface of the pallet 90 to a lower surface of the clamping portion 110. Therefore, the holders 92a to 92d are held in a manner enabling them to revolve, by means of the revolving shaft 130, with respect to the pallet 90 and the coupling jigs 104.

The revolving shaft 130 is a hollow body, and its opening diameter corresponds to a diameter of the drive shaft 56. Moreover, as shown in FIG. 6, two engagement notches 132 that are entered by the engagement bar 86 to be engaged with by the engagement bar 86, are formed in a lower end of the revolving shaft 130 at positions separated approximately 180° from each other. A lower end side of the engagement notch 132 is an open end that is opened, and an upper end side of the engagement notch 132 is a blocking end whose ceiling wall serves as a stopper.

As shown in FIG. 8, the cam followers 100 held in the pallet 90 make sliding contact with a lower surface of the holding main body portion 124 configuring each of the holders 92a to 92d. On the other hand, an upper surface of the holding main body portion 124 has a plurality of holding holes 136 formed therein along a circular arc (refer to FIG.

7). The first legs 12 of typically four segments 10 (at least one segment), and the second legs 14 of four other segments 10 (at least another one segment) are inserted in one holding hole 136. Note that in FIG. 8, a bundled plurality of the segments 10 are schematically shown in a lump. Moreover, in FIG. 10, a state when the segments 10 have been held in the holding holes 136 of the holders 92a to 92d is shown as a plan view.

In the above configuration, the roller conveyor 34, the lifting cylinder 36, and the revolving cylinders 66a to 66d are electrically connected to an unillustrated control circuit.

The alignment apparatus 30 according to the present embodiment is basically configured as described above, and next its operational advantages will be described.

In the preliminary alignment section, a plurality of bundles (for example, 18 bundles) of segments 10, where four segments 10 are assumed to be one bundle, are preliminarily aligned in an arc shape. The preliminarily aligned segments 10 are transported while being held in the arc shape, by the first transport mechanism, and their first legs 12 are inserted in one holding hole 136 of the holding main body portion 124 configuring the holders 92a to 92d and their second legs 14 are inserted in another holding hole 136. As described above, one holding hole 136 typically has inserted therein the first legs 12 of four segments 10 and the second legs 14 of different four segments 10.

At this time point, the holders 92a to 92d are being pulled by the return springs 118. Therefore, the holders 92a to 92d are in an opened positions separated from each other (refer to FIG. 9), and outer circumferential sides in vicinities of ends of the holding main body portions 124 are abutting on the opened-side stopper blocks 114.

The holding unit 40 that has the segments 10 held in the holders 92a to 92d is placed on the roller conveyor 34 (refer to FIG. 3). The rollers 44 of the roller conveyor 34 rotate to pass on the holding unit 40, thereby conveying the holding unit 40. The holding unit 40 is positioned by the alignment section 42.

The holding unit 40 having reached the alignment section 42 is detected by a sensor, for example. The control circuit that has received this detection signal next energizes the lifting cylinder 36 to advance (raise) the lifting rod 46. Consequently, the revolving operation unit 38 that has been attached in advance to a distal end of the lifting rod 46 via the adaptor 48 ascends integrally with the lifting rod 46.

Figure 11A:
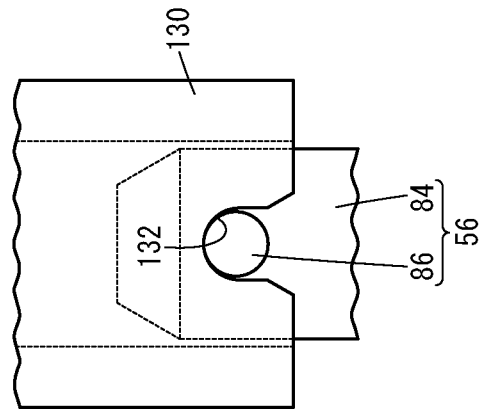
FIGS. 11A, 11B, and 11C are schematic flow diagrams showing in side view a process of the drive shaft engaging with the revolving shaft to further ascend.
Figure 11B:
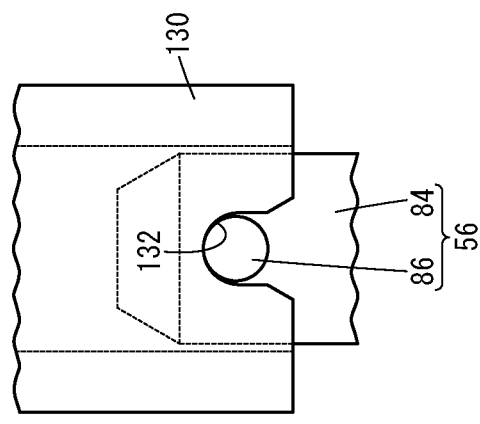

As the revolving operation unit 38 ascends, the drive shaft 56 enters a hollow interior of the revolving shaft 130 in the first revolution hole 102, and the engagement bar 86 enters the engagement notches 132 to abut on the ceiling walls of the engagement notches 132, as shown in FIGS. 11A and 11B. As a result, as shown in FIG. 8, the drive shaft 56 is coupled to the revolving shaft 130. As will be mentioned later, the drive shaft 56 separates from the hollow interior of the revolving shaft 130 as the lifting rod 46 descends. That is, the drive shaft 56 is coupled to the revolving shaft 130 in an attachable and detachable manner.

When the lifting rod 46 attempts to further ascend after the engagement bar 86 has abutted on the ceiling walls of the engagement notches 132, a load of a weight portion of the holding unit 40 acts on the lifting rod 46. The control circuit that has detected this load temporarily stops the lifting rod 46, and then sends to the revolving cylinders 66a to 66d (refer to FIG. 4) a control signal to "advance the revolving rod 68". The revolving cylinders 66a to 66d that have received this control signal advance the revolving rods 68.

Due to advancement of the revolving rods 68, the turntables 54a to 54d are rotationally energized. This is because, as described above, the rod side coupling shaft 70 arranged upright on each of the revolving rods 68 is inserted in the rod side coupling hole 76 formed in each of the turntables 54a to 54d. The turntables 54a to 54d each rotate by an angle proportional to an advancement amount of the revolving rod 68.

Moreover, since each of the link members 58a to 58d extends between and couples together adjacent two of the turntables 54a to 54d, rotation of the turntables 54a to 54d results in the first link side coupling shaft 62 inserted in the first link side coupling hole 74, of each of the link members 58a to 58d being pushed, and the second link side coupling shaft 64 fitted in the second link side coupling hole 80, of each of the link members 58a to 58d being pulled. This pushing and pulling results in the turntables 54a to 54d rotating synchronously.

When the turntables 54a to 54d rotate, a center of each of the turntables 54a to 54d, that is, the drive shaft 56 provided in a rotational center of each of the turntables 54a to 54d rotates. Since the engagement bar 86 of the drive shaft 56 is engaged with the engagement notches 132, a rotational drive force of the drive shaft 56 is transmitted to the revolving shaft 130, and, as a result, the revolving shaft 130 rotates following the drive shaft 56.

The revolving shaft 130 is inserted through the second revolution hole 112 of the handle portion 122 of each of the holders 92a to 92d. Therefore, as the revolving shaft 130 rotates following the drive shaft 56, each of the holders 92a to 92d revolves counterclockwise with the second revolution hole 112 or the revolving shaft 130 as a revolution center, in such a manner that one end of each of the holders 92a to 92d moves in an inward direction of an imaginary circle. This revolution is assisted by the cam followers 100 (refer to FIGS. 7 and 8) that make sliding contact with the lower surface of the holding main body portion 124. That is, revolution of the holders 92a to 92d proceeds smoothly due to the cam followers 100 being provided.

Figure 12:
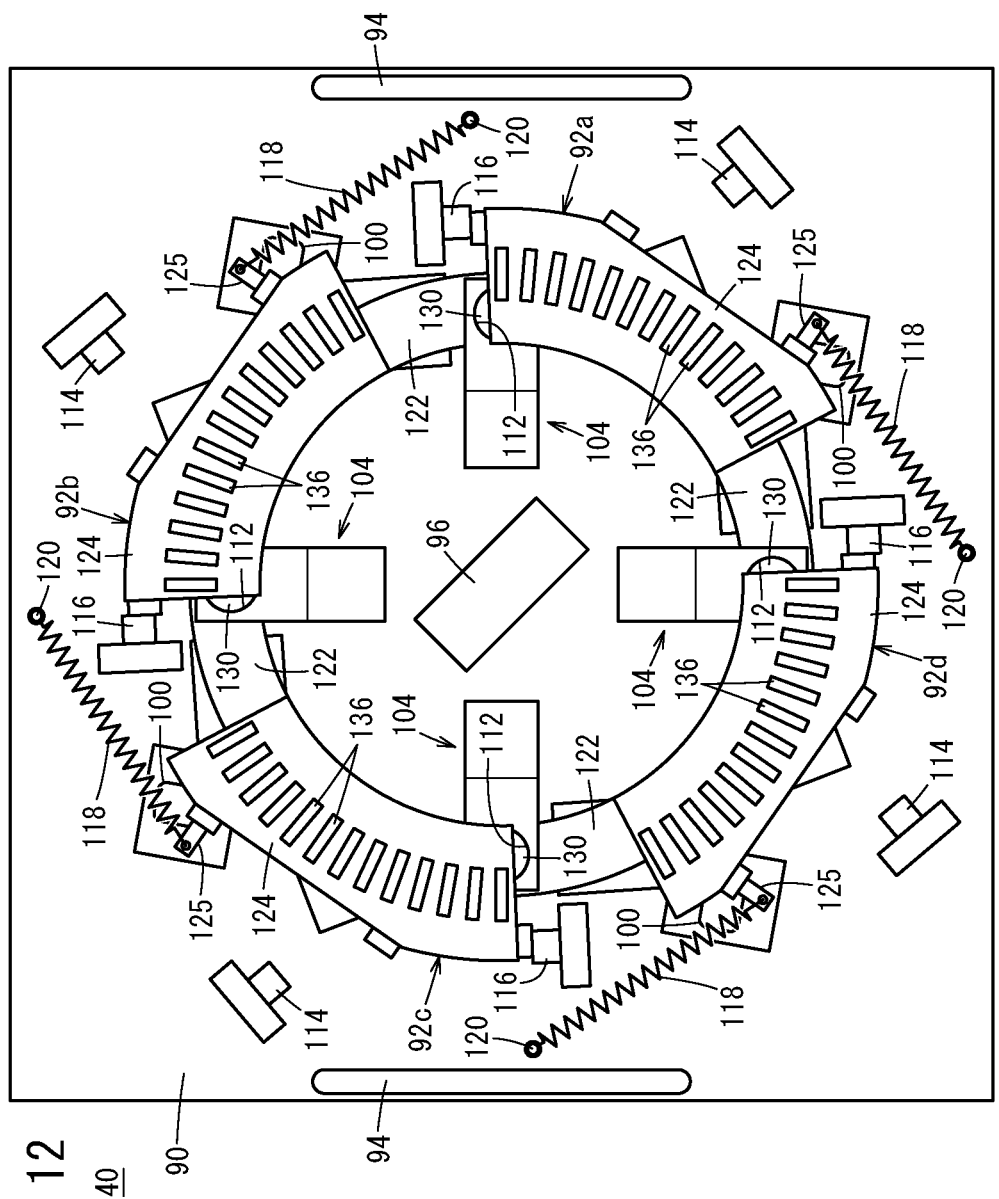
FIG. 12 is a schematic plan view showing when the holder has revolved from FIG. 9 to thereby reach a closed state.
Figure 13:
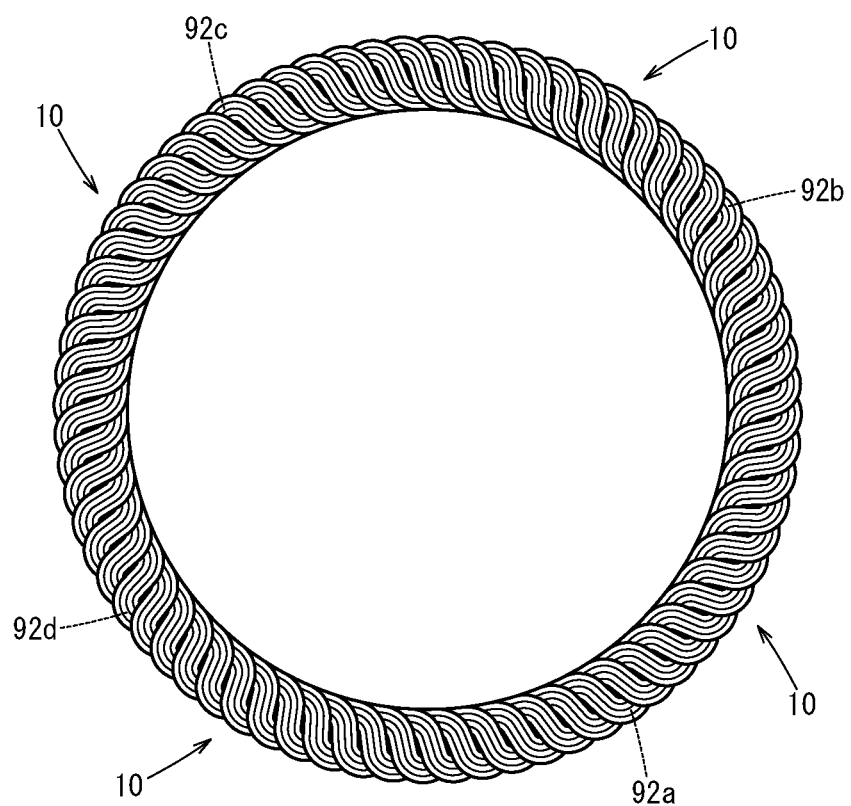
FIG. 13 is a schematic plan view showing annularly aligned electric conductors.

Due to all of the holders 92a to 92d revolving, the holders 92a to 92d move toward a closed state shown in FIG. 12, and the segments 10 held in the holding holes 136 of the holders 92a to 92d line up so as to be aligned on the same circular circumference, as shown in FIG. 13. That is, an annularly shaped body is formed by a certain number of the segments 10. Thus, by the link mechanism 60 being configured by all of the turntables 54a to 54d and all of the link members 58a to 58d, it becomes easy for the four holders 92a to 92d to be synchronously revolved, and for the annularly shaped body of the segments 10 to be resultantly formed.

One end of the holding main body portion 124 that is remoter from the handle portion 122 abuts on the closed-side stopper block 116, whereby each of the holders 92a to 92d stops. Thus, by the holders 92a to 92d abutting on the robust closed-side stopper blocks 116, the holders 92a to 92d can be reliably positioned. That is, positioning accuracy of the holders 92a to 92d is improved.

Now, it is assumed there will occur a condition where, for example, due to a slight difference having occurred in movement speeds or phases between the holder 92a and the holders 92b to 92d, the holder 92a still has not abutted on the closed-side stopper block 116, even though the holders 92b to 92d each have abutted on the closed-side stopper block 116. When the revolving cylinders 66a to 66d are stopped under this condition, the segments 10 held in the holder 92a will be in a non-aligned state where a slight positional deviation has occurred with respect to the imaginary circle formed by the segments 10 held in the holders 92b to 92d. It is not easy for the segments 10 in such a non-aligned state to be inserted in the slots. Moreover, there is concern that the segments 10 in the non-aligned state and the segments 10 in an aligned state make sliding contact in the course of conveyance or transportation, and damage occurs to the segments 10.

In the present embodiment, the rod side coupling hole 76 and the second link side coupling hole 80 are each configured as an elongated hole which is slightly long along the rotational direction of the turntable 54a (the circling direction of the turntable 54a) (refer particularly to FIG. 5). Therefore, even when the holders 92b to 92d have each stopped by abutting on the closed-side stopper block 116, the revolving rod 68 of the revolving cylinder 66a is capable of undergoing relative displacement along the elongated hole. That is, the revolving rod 68 of the revolving cylinder 66a slightly advances even after the holders 92b to 92d have stopped. The turntable 54a can rotate in accordance with the amount of the advancement.

Hence, the holder 92a rotates until it abuts on the closed-side stopper block 116. As a result, the segments 10 held in the holder 92a are aligned on the same circular circumference as the imaginary circle formed by the segments 10 held in the holders 92b to 92d. That is, the annularly shaped body can be accurately formed. Ultimately, due to the rod side coupling hole 76 and the second link side coupling hole 80 being configured as elongated holes, the holder 92a can be rotated by a slight angle, and its stopping position can be matched to stopping positions of the other holders 92b to 92d, even after the other holders 92b to 92d have abutted on the closed-side stopper blocks 116, in the case of the holders 92a to 92d being synchronously rotated.

Moreover, since the revolving cylinders 66a to 66d are individually provided to the turntables 54a to 54d, a rotational drive force can be applied to the turntable 54a to revolve the holder 92a, even after the turntables 54b to 54d have stopped. Note that although the holder 92a has been exemplified in the above description, the same applies also when any one of the holders 92b to 92d has not abutted on the closed-side stopper block 116. Moreover, even under a condition where some of the holders 92a to 92d have abutted on the closed-side stopper blocks 116, while the other of the holders 92a to 92d have not abutted on the closed-side stopper blocks 116, all of the holders 92a to 92d can be revolved until they abut on the closed-side stopper blocks 116, similarly to as described above.

Figure 11C:
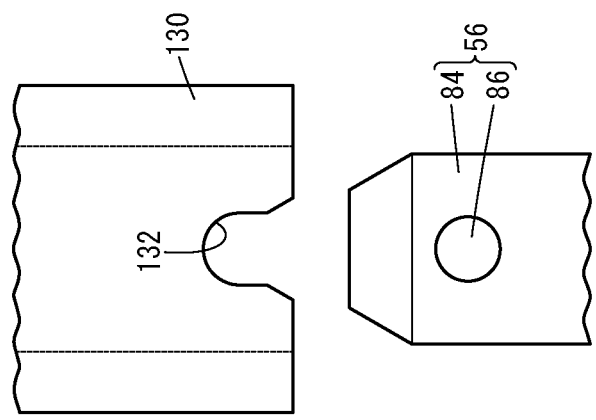

The control circuit that has recognized that all of the holders 92a to 92d have stopped, next energizes the lifting cylinder 36 to advance (raise) the lifting rod 46. Since the drive shaft 56 of the revolving operation unit 38 and the revolving shaft 130 of the holding unit 40 are vertically coupled, the engagement bar 86 of the drive shaft 56 engaged with the engagement notches 132 of the revolving shaft 130, pushes up the revolving shaft 130, as shown in FIG. 11C. As a result, the revolving operation unit 38 and the holding unit 40 ascend integrally with the lifting rod 46.

When the holding unit 40 stops at a position shown by the imaginary line in FIG. 3, that is, at the gripping section 49, the segments 10 aligned as the annularly shaped body are gripped and lifted by the second transport mechanism, whereby the first legs 12 and the second legs 14 separate from the holding holes 136. The second transport mechanism further transports the segments 10 to the stator core 20 (refer to FIG. 2) as the annularly shaped body, and inserts the first legs 12 and the second legs 14 in the slots. Then, the segments 10 are twisted as required, and furthermore, the first legs 12 and second legs 14 are joined to the first legs 12 or second legs 14 of a different segment 10. This results in the stator 22 being obtained.

Then, the lifting rod 46 retracts (descends) under control action of the control circuit. After the revolving operation unit 38 and the holding unit 40 have descended to the alignment section 42 integrally with the lifting rod 46, the revolving cylinders 66a to 66d are energized whereby the revolving rods 68 retract. Due to this retraction, the turntables 54a to 54d are rotationally energized to rotate by an angle proportional to a retraction amount of the revolving rods 68.

Following this rotation, the drive shafts 56 and the revolving shafts 130 rotate following the turntables 54a to 54d. As a result, each of the holders 92a to 92d revolves clockwise with the second revolution hole 112 or the revolving shaft 130 as a revolution center, in such a manner that one end of each of the holders 92a to 92d moves in an outward direction of an imaginary circle. That is, the holders 92a to 92d move toward the open state. Revolution to the open state is assisted by the cam followers 100 and the return springs 118.

Each of the holders 92a to 92d stops by an outer circumferential side in a vicinity of an end of its holding main body portion 124 abutting on the opened-side stopper block 114. Even when at least one of the holders 92a to 92d still has not abutted on the opened-side stopper block 114 at this time, it is possible for the revolving rod 68 coupled to the turntable rotating the holder to retract. This is because the rod side coupling hole 76 and the second link side coupling hole 80 are configured as elongated holes, as described above.

The control circuit that has detected that all of the holders 92a to 92d have stopped further retracts (lowers) the lifting rod 46. Due to this lowering, the drive shaft 56 of the revolving operation unit 38 separates from the revolving shaft 130. That is, coupling of the revolving operation unit 38 and the holding unit 40 is released.

The holding unit 40 is then extracted by the handles 94 of the pallet 90 being gripped by the operator or the robot. That is, the holding unit 40 is removed from the alignment section 42. The pallet 90 is provided with as much as the cam followers 100, the holders 92a to 92d, the opened-side stopper blocks 114, the closed-side stopper blocks 116, and the like, whose weights are comparatively small, and is not provided with the revolving cylinders 66a to 66d or the turntables 54a to 54d whose weights are large. Therefore, the holding unit 40 is comparatively light-weight, and this removing operation is easy to perform.

The holding unit 40 is allowed to flow along the roller conveyor 34 in a state of the segments 10 being held in each of the holding holes 136 of the holders 92a to 92d in order to be provided for the next occasion of alignment work of the segments 10. That is, the holding unit 40 is reused.

Now, the holding unit 40 is not provided with a device requiring electric power during drive. As a result, the holding unit 40 can be manufactured at low cost. Hence, by manufacturing a plurality of the holding units 40 and repeating the above-described alignment work, it becomes possible for the stator 22 to be obtained at low cost and efficiently.

The present invention is not particularly limited to the above-described embodiment, and may be variously modified without departing from the essence and gist of the present invention.

For example, although in the above-described embodiment, the rod side coupling hole 76 and the second link side coupling hole 80 are formed as elongated holes, it is sufficient for only either one of the rod side coupling hole 76 and the second link side coupling hole 80 to be formed as an elongated hole. Moreover, a configuration may be adopted whereby at least either one of the first link side coupling hole 74 and the rod side coupling hole 76 is formed as an elongated hole.

Furthermore, a belt conveyor may be adopted instead of the roller conveyor 34, as the guide mechanism.

Moreover, the number of holders and turntables may be three, or may be five or six, and so on. Note that the number of holders and turntables is preferably a divisor of 360.

What is claimed is:

1. An alignment apparatus for electric conductors, for annularly aligning electric conductors, each of the electric conductors including: a first leg and a second leg extending substantially in parallel with each other; and a folded-back portion connected between the first leg and the second leg, the apparatus comprising:
   a base provided with a plurality of revolving shafts in a revolvable manner;
   a plurality of holders individually configured to be coupled to one of the plurality of revolving shafts and configured to support at least one of the first leg or the second leg and hold a plurality of the electric conductors in an arc-shape-aligned state; and
   a revolving mechanism configured to, by revolving the plurality of holders, revolve the arc-shape-aligned electric conductors and dispose the arc-shape-aligned electric conductors on a same circular circumference thereby annularly aligning the arc-shape-aligned electric conductors,
   wherein
   the revolving mechanism includes
      a plurality of drive shafts configured to be coupled to each of the plurality of revolving shafts in an attachable and detachable manner, and
      a plurality of turntables each provided with one of the plurality of drive shafts and configured to rotate integrally with the one of the plurality of drive shafts, adjacent two of the plurality of turntables are coupled together via one link member.

2. The alignment apparatus for the electric conductors according to claim 1, wherein one of the turntable and the link member is provided with a coupling shaft, and another one of the turntable and the link member has, formed therein, a coupling hole into which the coupling shaft is inserted, and
   the coupling hole is formed as an elongated hole in which the coupling shaft is movable in a revolving direction of the holder.

3. The alignment apparatus for the electric conductors according to claim 1, wherein each of the turntables is individually provided with a rotational drive unit configured to rotationally drive the turntable.

4. The alignment apparatus for the electric conductors according to claim 1, further comprising: a revolving mechanism support panel where the revolving mechanism is provided; and a lifting mechanism configured to raise and lower the revolving mechanism support panel,
   wherein the revolving mechanism support panel and the base in a state where the drive shaft and the revolving shaft are coupled to each other are raised and lowered integrally with each other by the lifting mechanism.

5. The alignment apparatus for the electric conductors according to claim 4, further comprising a guide mechanism configured to guide the base to the lifting mechanism.

6. The alignment apparatus for the electric conductors according to claim 1, wherein the base is provided with a rotating body configured to assist revolution of the holder.

7. The alignment apparatus for the electric conductors according to claim 1, wherein the base is provided with a stopper portion configured to abut on each of the plurality of holders.

* * * * *